US012679320B2

(12) United States Patent
Luo et al.

(10) Patent No.: US 12,679,320 B2
(45) Date of Patent: Jul. 14, 2026

(54) CONTROLLING METHOD FOR AN ACTUATOR, ACTUATOR, AND ELECTROMECHANICAL BRAKE SYSTEM

(71) Applicant: Haldex Brake Products Aktiebolag, Landskrona (SE)

(72) Inventors: Jiajun Luo, Shanghai (CN); Christian Rylander, Shanghai (CN)

(73) Assignee: Haldex Aktiebolag, Landskrona (SE)

( * ) Notice: Subject to any disclaimer, the term of this patent is extended or adjusted under 35 U.S.C. 154(b) by 712 days.

(21) Appl. No.: 17/483,860

(22) Filed: Sep. 24, 2021

(65) Prior Publication Data

US 2022/0009464 A1    Jan. 13, 2022

Related U.S. Application Data

(63) Continuation of application No. PCT/EP2020/057822, filed on Mar. 20, 2020.

(51) Int. Cl.
| | |
|---|---|
| *B60T 13/74* | (2006.01) |
| *B60T 8/171* | (2006.01) |
| *B60T 8/173* | (2006.01) |

(52) U.S. Cl.
CPC ............ *B60T 13/748* (2013.01); *B60T 8/171* (2013.01); *B60T 8/173* (2013.01); *B60T 2270/82* (2013.01)

(58) Field of Classification Search
CPC .................................................... B60T 13/748
See application file for complete search history.

(56) References Cited

U.S. PATENT DOCUMENTS

| | | | | |
|---|---|---|---|---|
| 5,811,947 | A * | 9/1998 | Hurst ...................... | F04B 49/06 |
| | | | | 318/434 |
| 2010/0241324 | A1* | 9/2010 | Ishikawa ................. | F16H 61/32 |
| | | | | 701/55 |
| 2011/0060511 | A1* | 3/2011 | Kim ...................... | B60T 13/741 |
| | | | | 701/74 |

FOREIGN PATENT DOCUMENTS

| | | | |
|---|---|---|---|
| CN | 104261257 | A * | 1/2015 |
| CN | 107462423 | * | 12/2017 |
| EP | 2 907 709 | A1 | 8/2015 |
| EP | 2 927 531 | A1 | 10/2015 |
| EP | 3 056 400 | A1 | 8/2016 |
| EP | 3 241 713 | A1 | 11/2017 |

(Continued)

OTHER PUBLICATIONS

International Search Report issued by the International Searching Authority for PCT application PCT/EP2020/057822 on May 19, 2020.

*Primary Examiner* — Melody M Burch
(74) *Attorney, Agent, or Firm* — Price Heneveld LLP

(57) ABSTRACT

This present disclosure provides a controlling method for an actuator (104), an actuator (104), and an electromechanical brake system of brake technology. The controlling method comprises: receiving a brake demand; controlling an electric motor (108) based on the brake demand; if the brake demand satisfies a preset stationary condition within a preset period, controlling a brake force holding device (108) to lock a shaft. In this way, frequent variations of the brake demand caused by interference from ambient disturbance or the driver's unsteady brake instructions may be prevented so that the actuator can be locked timely, thereby maintaining a continuous brake torque output with low power consumption or zero power consumption to provide a continuous brake force to the vehicle.

28 Claims, 9 Drawing Sheets

(56)     References Cited

FOREIGN PATENT DOCUMENTS

| KR | 2013000917 | A | * | 1/2013 | | |
| WO | WO-2012161204 | A1 | * | 11/2012 | ........... | B60T 13/741 |
| WO | 2017/026472 | A1 | | 8/2016 | | |

* cited by examiner

CONTROLLING METHOD FOR AN ACTUATOR, ACTUATOR, AND ELECTROMECHANICAL BRAKE SYSTEM

CROSS REFERENCE TO RELATED APPLICATIONS

This application is a continuation of International Application PCT/EP2020/057822 with an international filing date of Mar. 20, 2020 and claiming priority to co-pending Chinese Patent Application No. CN 201910227821.1 entitled "Controlling method for an actuator, actuator, and electromechanical brake system", filed on Mar. 25, 2019.

FIELD OF THE INVENTION

Embodiments of the present disclosure generally relate to the field of brake technology, and more particularly relate to a controlling method for an actuator, an actuator, and an electromechanical brake system.

BACKGROUND OF THE INVENTION

With development of electronic technologies and improvement of vehicle intelligence, pure electromechanical brake (EMB)-by-wire systems, which are characterized by a simpler structure, a higher functional integration, and a better matching to an unmanned drive system, have been gradually replacing conventional hydraulic or pneumatic brakes, and thus become a development orientation for future vehicle brake technologies.

A vehicle needs to maintain a working condition of holding a brake force for a long time during stopping or driving, e.g., parking, driving down a long slope, etc. As the brake force of an EMB system is originated from an electric motor-driven actuator, a long-time brake force output of the electric motor would cause issues such as a motor stall and an over large power consumption, etc. Therefore, a brake force holding device, which may hold a generated brake force in a low energy consumption state or in a power off state, is always provided in the actuator. Examples of the brake force holding device include a solenoid, an electromagnetic brake, etc.

A vehicle is generally already in a stop state when a parking function is activated, and a parking signal input device is usually provided independently from a parking lever or a parking button of a brake pedal, such that the ambient upon inputting a parking signal is stable and the parking signal is simple and less likely to be affected. However, upon braking during driving, as the vehicle is in a driving state, variation of the ambient would cause a driver unable to precisely hold pressing-down of the brake pedal. In this case, it becomes an urgent problem to solve how to process a brake signal acquired by the brake pedal to get the driver's brake intention to thereby timely activate or release the brake force holding device.

Further prior art is known from EP 3 241 713 A1, EP 3 056 400 A1, WO 2017/026472 A1, EP 2 907 709 A1, EP 2 927 531 A1.

SUMMARY OF THE INVENTION

To overcome the drawbacks and deficiencies in the prior art, the present disclosure provides a controlling method for an actuator, an actuator, and an electromechanical brake system, for controlling a working process of an actuator dependent on a brake demand. With the novel invention, it is possible to provide a controlling method for an actuator, an actuator, and an electromechanical brake system wherein the power consumption is improved.

In a first alternative aspect of the present disclosure, a controlling method for an actuator is provided, the actuator comprising an electric motor with a shaft and a brake force holding device capable of locking the shaft, the controlling method comprising:

receiving brake demand;

controlling the electric motor based on the brake demand;

if the brake demand satisfies a preset stationary condition within a preset period, controlling the brake force holding device to lock the shaft.

Optionally, a desired electric motor rotated position of the electric motor is generated dependent on the brake demand.

Optionally, the controlling method further comprises:

filtering the desired electric motor rotated position;

the preset stationary condition further includes that: a filtered desired electric motor rotated position is located within a preset tolerance zone.

Optionally, the controlling method further comprises: smoothing the desired electric motor rotated position.

Optionally, the preset stationary condition includes that: the desired electric motor rotated position within the preset period is always located within the preset tolerance zone.

Optionally, the controlling method further comprises: receiving or calculating a measured electric motor rotated position;

the preset stationary condition further includes obtaining a difference between the measured electric motor rotated position and the desired electric motor rotated position, the difference being smaller than a preset position threshold.

Optionally, the controlling method further comprises: receiving a measured electric motor rotation speed;

the preset stationary condition further includes that the measured electric motor rotation speed is lower than a preset rotation speed threshold.

Optionally, the actuator further comprises a counter configured for recording a valid brake demand.

Optionally, the counter is caused to count brake demands which satisfy the preset stationary condition;

if there exists a brake demand which does not satisfy the preset stationary condition, a clearing operation on the counter is performed.

Optionally, dynamic adjustment is performed to the preset stationary condition dependent on factors including a vehicle load, a vehicle speed, a slip ratio, a brake disc temperature, and a brake pad wear.

Optionally, the controlling method further comprises controlling the brake force holding device to release the shaft and controlling, before the releasing, the electric motor to output a torque in a same direction as before the locking.

Optionally, when the brake demand is generated by a non-human operation, the brake force holding device performs an instantaneous response to the brake demand.

Optionally, the brake force holding device comprises one or more among an electromagnetic brake, a solenoid, and a ratchet mechanism.

Optionally, after the brake force holding device locks the shaft, if the brake demand satisfies a preset non-steady state condition, the brake force holding device is controlled to release the shaft, wherein the preset non-steady state condition is different from the preset steady state condition.

In a second alternative aspect of the present disclosure, an actuator is provided, the actuator comprising an electric motor with a shaft and a brake force holding device capable of locking the shaft, the actuator further comprising:

a demand receiving unit configured for receiving a brake demand;

an electric motor controlling unit configured for controlling the electric motor based on the brake demand;

a brake force holding device controlling unit configured for: if the brake demand satisfies a preset stationary condition within a preset period, controlling the brake force holding device to lock the shaft.

Optionally, the electric motor controlling unit generates a desired electric motor rotated position dependent on the brake demand.

Optionally, the actuator further comprises a filtering module, wherein the preset stationary condition includes that: a desired electric motor rotated position filtered by the filtering module is located within a preset tolerance zone.

Optionally, the actuator further comprises a smoothing module configured for smoothing the desired electric motor rotated position.

Optionally, the preset stationary condition includes that: the desired electric motor rotated position is always located within a preset tolerance zone during the preset period.

Optionally, the actuator further comprises an electric motor rotated position sensor or an electric motor rotated position calculating unit configured for obtaining a measured electric motor rotated position;

the preset stationary condition further includes: obtaining a difference between the measured electric motor rotated position and the desired electric motor rotated position, the difference being smaller than a preset position threshold.

Optionally, the actuator further comprises an electric motor rotation speed obtaining module configured for obtaining a measured electric motor rotation speed;

the preset stationary condition further includes that the measured electric motor rotation speed is lower than a preset rotation speed threshold.

Optionally, the actuator further comprises a counter configured for recording a valid brake demand.

Optionally, the counter is caused to count brake demands which satisfy the preset stationary condition;

if there exists a brake demand which does not satisfy the preset stationary condition, a clearing operation on the counter is performed.

Optionally, the actuator further comprises a dynamic adjusting module configured for dynamically adjusting the preset stationary condition dependent on factors including a vehicle load, a vehicle speed, a slip ratio, a brake disc temperature, and a brake pad wear.

Optionally, the brake force holding device controlling unit is further configured for controlling the brake force holding device to release the shaft, and the electric motor controlling unit is further configured for controlling, before the releasing, the electric motor to output a torque in a same direction as before the locking.

Optionally, the brake force holding device controlling unit is further configured for controlling, when the brake demand is generated by a non-human operation, the brake force holding device to perform an instantaneous response to the brake demand.

Optionally, the brake force holding device comprises one or more among an electromagnetic brake, a solenoid, and a ratchet mechanism.

Optionally, the brake force holding device controlling unit is configured for: after the brake force holding device controlling unit locks the shaft, if the brake demand satisfies the preset non-steady state condition, controlling the brake force holding device to release the shaft, wherein the preset non-steady state condition is different from the preset steady state condition.

In a third alternative aspect of the present disclosure, an electromechanical brake system is provided, comprising the actuator as mentioned above.

The technical solution of the present disclosure brings about the following technical effects:

1. Determination based on a preset stationary condition is performed to the received brake demands such that the shaft is locked only when all brake demands within a preset period satisfy the preset stationary condition; in this way, an interference from ambient disturbance to determination of the driver's brake intention may be prevented, and it may be assured that the system timely activates the brake force holding device, thereby reducing power consumption of the brake system.

2. The controlling method based on the electric motor rotated position can determine the brake intention more accurately, which facilitates determining the brake effect.

3. By determining based on the preset stationary condition after filtering the generated desired electric motor rotated position, noise interference may be removed.

4. By performing a determination based on the preset stationary condition after subjecting the generated desired electric motor rotated position to smoothing, accuracy may be enhanced and noise interference may be removed.

5. By obtaining the measured electric motor rotated position and using a difference between the measured electric motor rotated position and the desired electric motor rotated position as an input for determining based on a preset stationary condition, computational complexity of the system is lowered.

6. By introducing the concept of measured electric motor rotation speed to eliminate the circumstances without a need of holding the brake force, the accuracy of determining is improved.

7. By introducing a counter for counting valid brake demands such that a brake force holding operation is performed when the counts of valid break demands reach a threshold, if a brake demand not satisfying the preset stationary condition appears before reaching the threshold, it indicates that the brake demand is still in change, and at this point, the counter is cleared.

8. Before releasing the brake force holding operation, the electric motor is caused to output a torque in a same direction as before the locking, which causes the operation of releasing the brake force steadier, thereby protecting the mechanical structure and the circuit.

9. When a brake demand is generated by a non-human operation such as an ACC (Adaptive Cruise Control), an ABS system (Anti-Lock Braking System), and an autopilot system, as it is unnecessary to determine the driver's intention, the electric motor and the brake force holding device perform an instantaneous response based on the brake demand.

10. By adopting different determination conditions for locking and releasing the electric motor, more vehicle models and actual driving states are adapted.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

To elucidate the technical solutions of the present disclosure more clearly, the drawings used in describing the embodiments will be briefly introduced below. It is apparent that the drawings as described only relate to some embodiments of the present disclosure. To those skilled in the art, different modifications and variations may be derived based on these drawings without exercise of inventive work, wherein.

DETAILED DESCRIPTION

To make the technical solutions and advantages of the present disclosure much clearer, the technical solution of the present disclosure will be further described with reference to the drawings.

Figure 1:
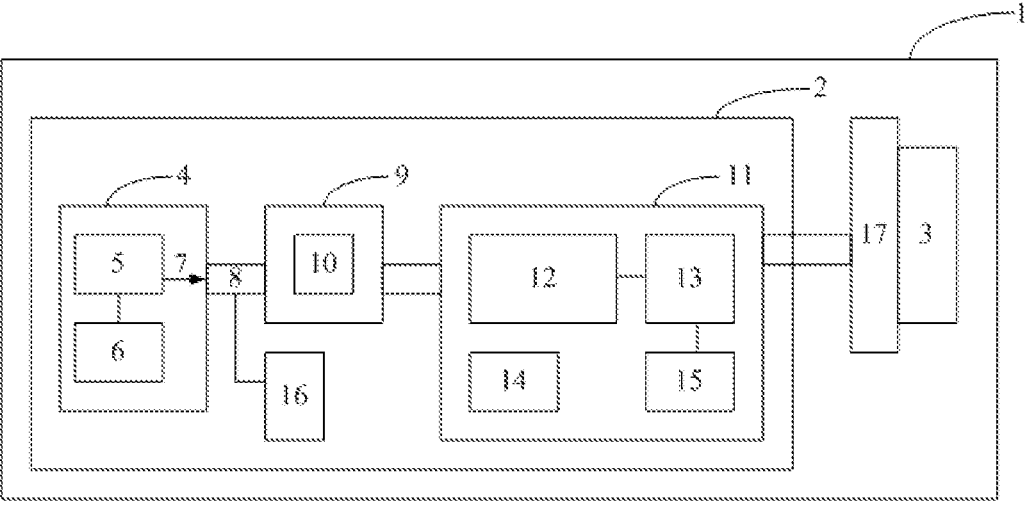
FIG. 1 is a schematic diagram of a disc brake assembly adapted to an electromechanical brake system.

FIG. 1 is a schematic diagram of a disc brake assembly 1 adapted to an electromechanical brake system. The disc brake assembly 1 includes an actuator 2 configured for pushing a brake pad 3 towards a brake disc (not shown) and applying a brake force to the brake pad 3. Various alternative transmission systems may be arranged between the actuator 2 and the brake pad 3. The brake pad 3 may be mounted on a thrust plate 17.

The actuator 2 comprises an electric motor 4, the electric motor 4 including a rotor 5 and a stator 6. The electric motor 4 is controlled by an electric motor controlling unit (not shown) to drive the rotor 5 to generate a drive torque 7, the drive torque 7 being transmitted to a transmission unit 9 via an output shaft 8 of the electric motor 4. The transmission unit 9 may play a role of speed reduction and torque boost through an appropriate transmission ratio by adopting, for example, a planetary gear set 10.

In a power transmission path, an additional transmission unit 11 may also be arranged after the transmission unit 9. Exemplarily, the transmission unit 11 comprises a roller slope transmission system 12 and/or a thread transmission system 13. The transmission unit 11 may convert a rotary motion of the transmission unit 9 to a straight-line motion acting on the thrust plate 17.

Besides, to detect an operating state of the disc brake assembly 1, a sensor is further integrated in the system. For example, a sensor 14 configured for obtaining a brake force, and a sensor 15 configured for obtaining a rotational angle of the thread transmission system 13.

Finally, a brake force holding device 16 for locking the output shaft 8 is further provided to hold the brake force in a low power consumption state or a zero power consumption state.

When a power off electromagnetic brake is adopted, the brake force may be held for a long time in a zero power consumption state. When a power applied electromagnetic brake is adopted, the brake force may be held for a long time in a low power consumption state. It needs to be noted that the brake force holding device 16 may also be, for example, a solenoid, a ratchet mechanism, etc.

Embodiment 1

Figure 2:
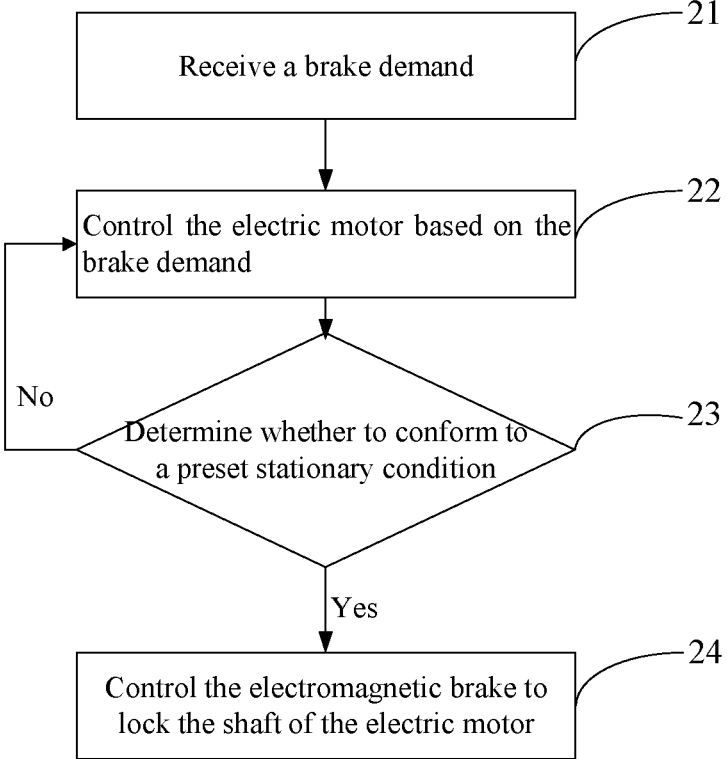
FIG. 2 is a flow diagram of Embodiment 1 of a controlling method provided by the present disclosure.

This embodiment provides a controlling method for an actuator; as shown in FIG. 2, the actuator comprising an electric motor with a shaft and a brake force holding device (e.g., a power off electromagnetic brake) capable of locking the shaft, the controlling method comprising:

21. receiving a brake demand;

22. controlling the electric motor based on the brake demand;

23. determining whether the brake demand satisfies a preset stationary condition;

if yes, 24. controlling the electromagnetic brake to lock the shaft of the electric motor;

if no, returning to step 22 to control the electric motor to adjust, based on the brake demand, a brake force output.

The controlling method for an actuator provided according to this embodiment is for determining the brake demand received; when the brake demand satisfies a preset stationary condition within a preset period, it is determined that the current brake demand reaches the steady state, which means the demand on the brake force is steady; at this point, power supply to the electromagnetic brake is stopped, i.e., the shaft of the electric motor is subjected to a lock operation, thereby implementing holding the brake force and outputting a continuous and steady brake force. Otherwise, the demand on the brake force is varying, which needs promptly adjusting the brake force output based on the brake demand, thereby maintaining power supply to the electromagnetic brake, enabling the shaft of the electric motor to rotate freely. When the brake demand signal is zero or no brake demand signal, it is also possible to determine based on the preset stationary condition, thereby to lock the shaft of the electric motor when a no braking needed stationary condition is satisfied.

Particularly, a preset period refers to a time length T for data acquisition, i.e., the electromagnetic brake is caused to lock the shaft of the electric motor only when the time length during which the brake demand as obtained satisfies the preset stationary condition is greater than or equal to the time length T. The preset period may be set based on the number and frequency of sampling the demand. Exemplarily, the driver's brake demand is inputted via a brake pedal; supposing that the sampling frequency of the sensor (e.g., a pressure sensor, an angle sensor, and a distance sensor, etc.) acquiring the input of the brake pedal is F and the number of signal values acquired during a data acquisition time duration T is S, then, the relationship among them is $T=F*S$.

In consideration of ambient interference, e.g., bumping on a road surface will affect acquisition of input of a brake demand. To enable the actuator to enter a brake force holding state at appropriate time when meeting a driving intention, the controlling method provided in this embodiment provides a manner of determining whether a brake demand within a preset period satisfies a preset stationary condition, which prevents the system from being too "sensitive" and from frequently starting the brake force holding device, or prevents consumption of too much electricity due to the system failing to timely actuate the brake force holding device. By virtue of the determining process above, the influence of ambient interference may be mitigated, and frequent variation of the brake demand caused by the driver's unsteady brake instructions may be prevented, such that the actuator may enter a low power consumption or zero power consumption brake force holding state at appropriate time, a constant brake force may be generated to the vehicle, and meanwhile, power consumption of the brake system may be lowered.

Embodiment 2

In the system shown in FIG. 1, the electric motor rotated position is associated with the amount of finally outputted brake force. Therefore, this embodiment uses the desired electric motor rotated position as an input for determining whether the brake demand satisfies a stationary condition.

Figure 3:
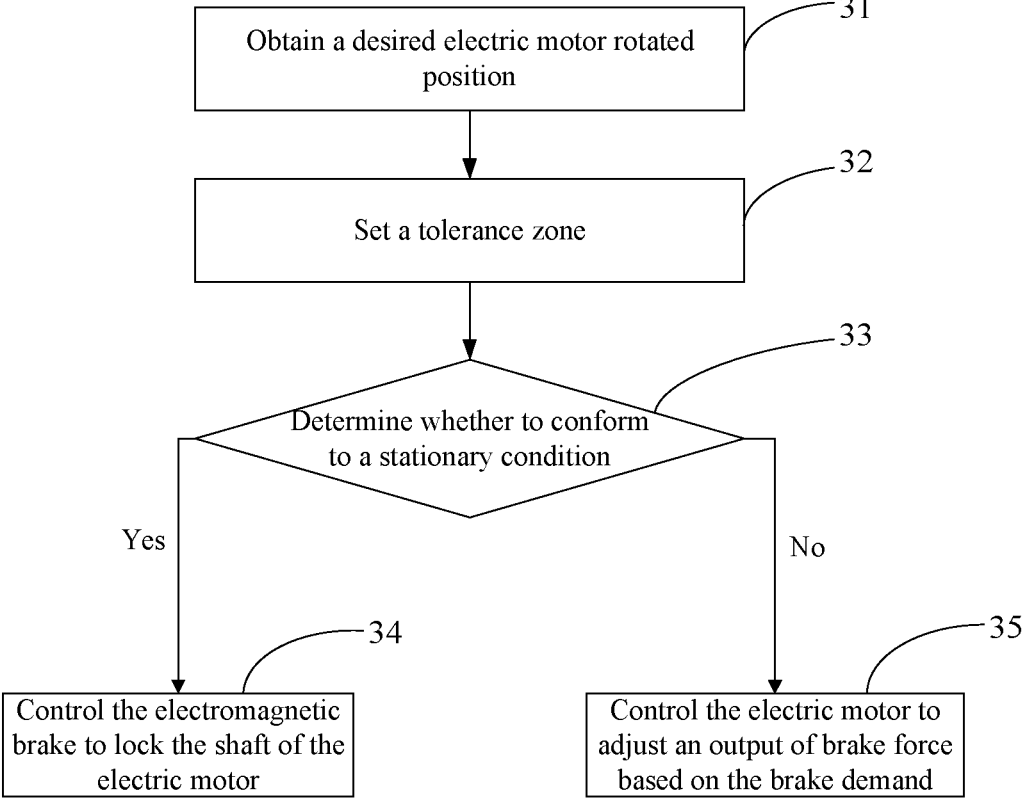
FIG. 3 is a flow diagram of Embodiment 2 of a controlling method provided by the present disclosure.

As shown in FIG. 3, a method provided by this embodiment comprises:

31. obtaining a desired electric motor rotated position;

32. setting a tolerance zone;

33. determining whether the brake demand satisfies a preset stationary condition;

if yes, 34. controlling the electromagnetic brake to lock a shaft of the electric motor;

if no, 35. controlling the electric motor to adjust output of a brake force based on the brake demand.

Specifically, in step 31, the desired electric motor rotated position is calculated based on a brake demand inputted, and the brake demand is obtained through the driver's pressing-down of the brake pedal, for example. Next, with the desired electric motor rotated position $P_0$ at the start point $T_0$ of the preset period as a reference point, and a tolerance zone is set based on a preset positive-negative variation amount, and in step 33, it is determined whether the desired electric motor rotated position $P_N$ subsequently obtained in the preset period T is also located within the tolerance zone. If all of the remaining $P_N$s are located within the tolerance zone, it is believed that the variation amplitude of the brake demand is very small, nearly constant, which satisfies the preset stationary condition; then, the electromagnetic brake is controlled to lock the shaft of the electric motor. Otherwise, if the $P_N$s are located beyond the tolerance zone, it is believed that the brake demand is in change and does not satisfy the stationary condition, such that it is needed to adjust the power output timely in response to the brake demand.

To further eliminate signal noises, before determining whether the $P_N$s are located within the tolerance zone, the $P_N$s may be filtered according to a certain manner. For example, a low-pass filter or a FIR filter (finite impulse response filter) may be adopted to eliminate the apparently exceptional signal values.

As a tolerance control criterion for the desired electric motor rotated position, the preset tolerance zone may be preset based on parameters such as a specific vehicle model may be adjusted in real-time based on an actual load, etc.

Embodiment 3

This embodiment provides another method of processing a desired electric motor rotated position. Different from the filtering processing adopted in Embodiment 2, this embodiment performs smoothing to the desired electric motor rotated position.

An exemplary smoothing approach, rolling average method comprises: obtaining a mean value of all current desired electric motor rotated positions, and using the obtained mean value as an input value for determining based on the preset stationary condition. For example, $$P_{smoothed} = \frac{P + P^{-1} + \ldots + P^{N-1}}{N} \qquad \text{Equation 1}$$

Equation 1 provides a smoothing approach of obtaining a mean value, wherein $P^{N-1}$ denotes the desired electric motor rotated positions included in a brake demand obtained in the previous N sampling times, and $P_{smoothed}$ denotes a calculated mean value of the desired electric motor rotated positions obtained in the previous N sampling times.

After obtaining the $P_{smoothed}$, the tolerance zone obtained based on the preset tolerance amount $P_{offset}$ is provided below:

$$[P_{smoothed} - P_{offset}, P_{smoothed} + P_{offset}]$$

Then, with the preset tolerance zone as the tolerance control criterion for the desired electric motor rotated position, the determining in step 33 is performed.

The smoothing approach provided in this embodiment may be separately implemented or implemented jointly with the filtering processing provided in Embodiment 2, so as to further improve the accuracy of the controlling method.

Embodiment 4

The Embodiment 2 and Embodiment 3 above are both processing approaches based on a brake demand, while the controlling method provided in this embodiment adopts a measured electric motor rotated position as an input for determining. The measured electric motor rotated position in this embodiment may be obtained by a sensor configured for detecting a rotation angle of an electric motor rotor or a transmission mechanism or by calculation of motor current, voltage or other system internal, external relevant parameters.

Figure 4:
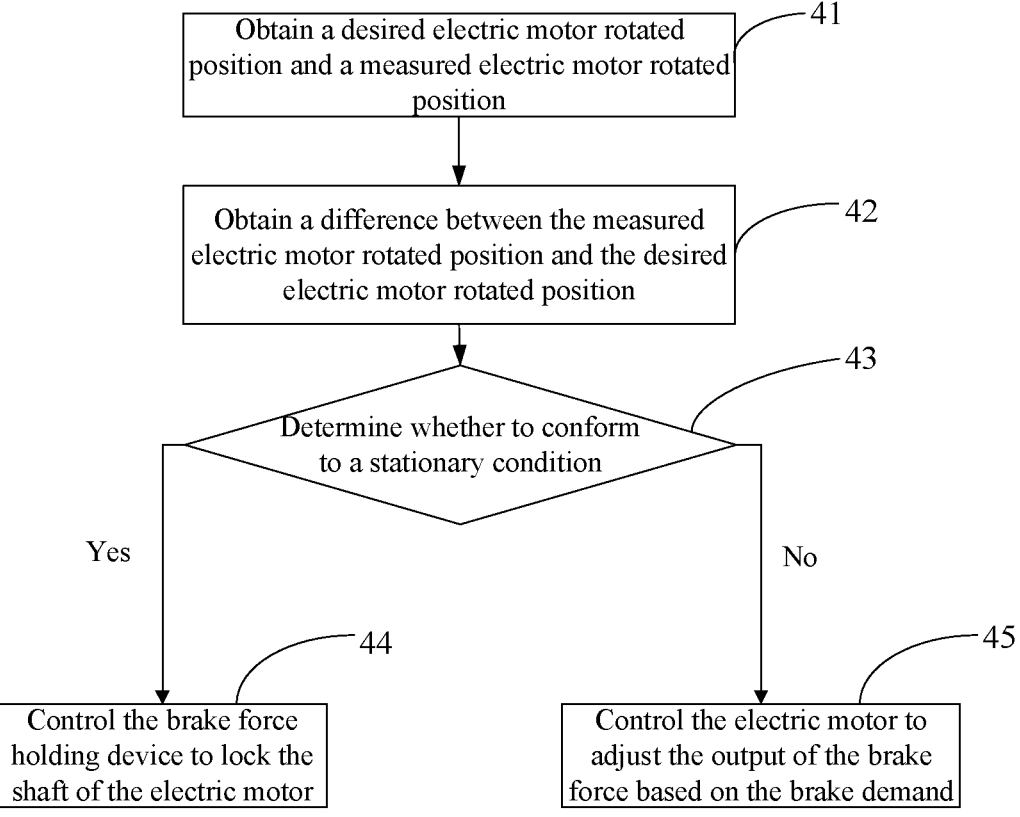
FIG. 4 is a flow diagram of Embodiment 4 of a controlling method provided by the present disclosure.

As shown in FIG. 4, a method provided by this embodiment comprises:

41. obtaining a desired electric motor rotated position and a measured electric motor rotated position;

42. obtaining a difference between the measured electric motor rotated position and the desired electric motor rotated position;

43. determining whether the brake demand satisfies a preset stationary condition;

if yes, controlling the brake force holding device to lock a shaft of the electric motor;

if no, 45. controlling the electric motor to adjust output of a brake force based on the brake demand.

Specifically, a corresponding amount of brake force is obtained for example based on a real-time brake demand acquired by for example a brake pedal, and then the amount of brake force is converted to the desired electric motor position $P_{desired}$, and meanwhile, the measured electric motor rotated position measured $P_{detected}$ by the sensor or calculated by relevant parameters is acquired; then, a difference $|P_{measured}-P_{desired}|$ therebetween is obtained in step 42. During the entire preset period T, if $|P_{measured}-P_{desired}|$ is constantly smaller than the preset threshold, it may be deemed as satisfying the stationary condition. If the difference therebetween is greater than the preset threshold, it is deemed as not satisfying the stationary condition, and the electric motor is continuously controlled based on the brake demand.

To further improve the precision of determining, the measured electric motor rotation speed may be further introduced as a supplemental condition for determining whether to satisfy the preset stationary condition. This is because based on the operating characteristics of the electric motor, during the process of adjusting the output, the electric motor will gradually reduce the rotation speed in the course of approaching the desired rotation position so as to guarantee that it is in an extremely low rotation speed or its rotation speed is zero when reaching the desired rotated position. Therefore, a relatively low preset rotation speed threshold is provided; when the rotation speed of the electric motor is higher than the threshold, it indicates that the electric motor is still in a state of rotating towards the desired rotated position or variation of the brake force is still large, such that the brake demand does not satisfy the preset stationary condition. When the rotation speed of the electric motor is lower than the threshold or is zero, it is believed that the electric motor has reached or almost reached the desired rotated position and the variation of the brake force is relatively small; if the brake demand further satisfies the preset stationary condition in any embodiment of the present disclosure, the brake force holding device is controlled to hold the generated brake force.

Embodiment 5

The controlling method for an actuator provided by this embodiment introduces the concept of a counter configured for counting a continuous valid brake demand.

Figure 5:
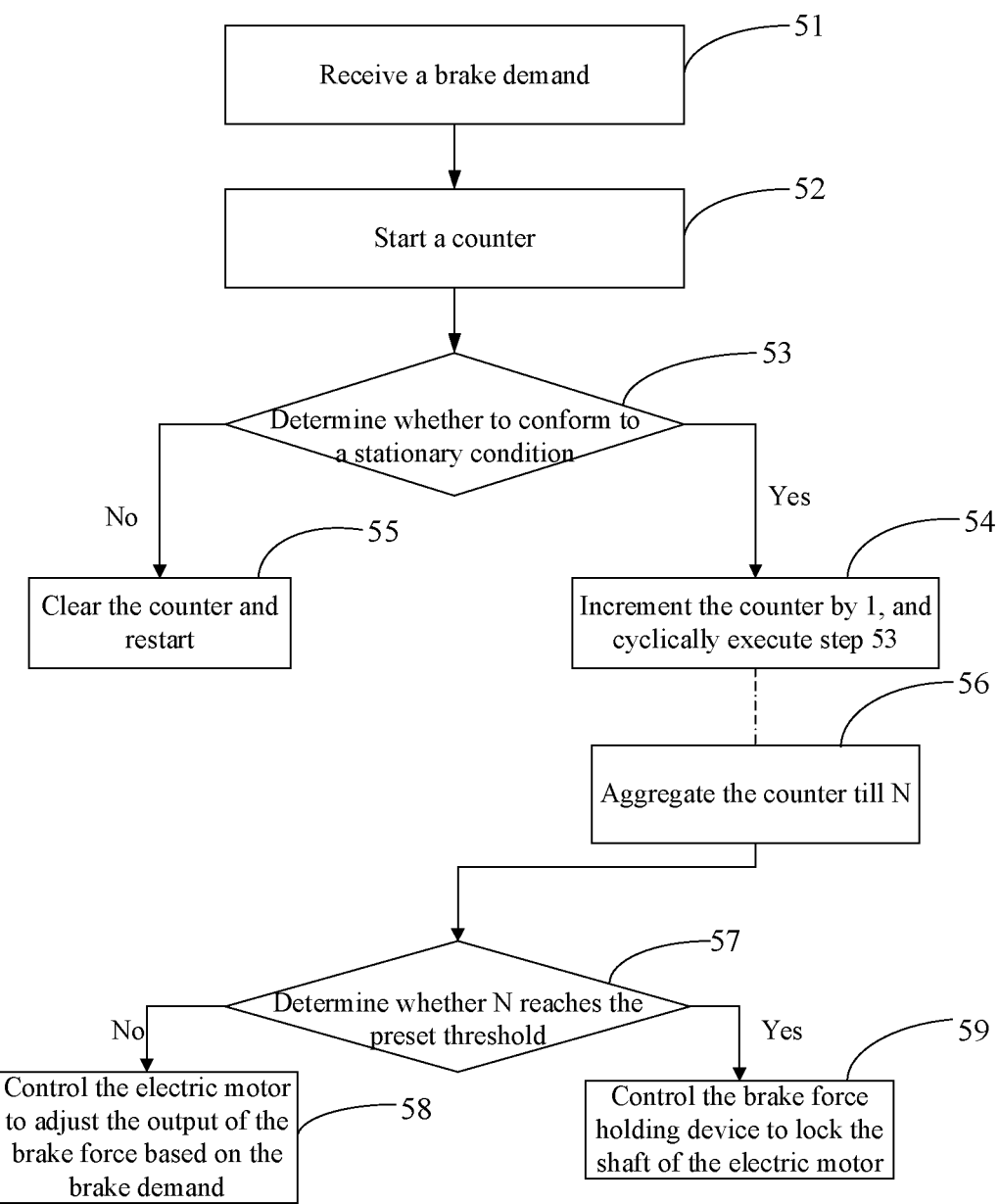
FIG. 5 is a flow diagram of Embodiment 5 of a controlling method provided by the present disclosure.

As shown in FIG. 5, a method provided by this embodiment comprises:

51. receiving a brake demand;

52. starting a counter;

53. determining whether the brake demand satisfies a preset stationary condition;

if yes, 54. incrementing the counter by 1, and cyclically executing step 53;

if no, 55. clearing the counter and restarting;

56. aggregating the counter till N;

57. determining whether N reaches a preset threshold;

if yes, 58. controlling the electric motor to adjust an output of brake force based on the brake demand;

if no, 59. controlling the brake force holding device to lock a shaft of the electric motor.

As discussed in Embodiment 1, the preset period refers to a time length T of acquiring data; the counter is started at the initial point T0 of the time length; each time when a datum satisfying a preset stationary condition is obtained, the counter is incremented by 1 till aggregating to the preset threshold, i.e., reaching a preset period; then it is determined that the brake demand within the entire period always satisfies the preset stationary condition, the brake force holding device is controlled to lock the shaft of the electric motor in step 59. If a brake demand not satisfying the preset stationary condition appears before aggregating to the preset threshold, the electric motor is continuously controlled to output a brake force corresponding to the brake demand, and the counter is cleared.

In step 55, as an exemplary embodiment, the counter always works during the entire operating time of the brake system, i.e., the counter is immediately restarted after each time of clearing. Another embodiment is to set a condition of starting the counter, e.g., the electric motor rotation speed, the amount of brake force, etc.; the counter only starts counting when the system satisfies the start condition of the counter. As an exemplary embodiment of obtaining a brake demand, the counter has advantages such as a simple logic and a low system resource energy consumption.

Embodiment 6

This embodiment provides a controlling method for releasing a held brake force. When the driver's drive intention changes, e.g., an intention to reduce the brake force, if the brake force holding device at this time is in a locked state and the locking cannot be released untimely, the electric motor cannot rotate freely to adjust the brake force. Therefore, a preset non-stationary condition is needed to trigger releasing of the brake force holding device.

A feasible implementation manner is to further use the preset stationary condition as the preset non-stationary condition. For example, in Embodiment 2, the preset stationary condition includes determining whether the desired electric motor rotated position is within the tolerance zone set in step 32; if this tolerance zone is used as the preset non-stationary condition, determination of whether to satisfy the condition is continuously performed after the step 34 of locking the electric motor. If the desired electric motor rotated position is located beyond the tolerance zone, it is determined that the brake demand at this point satisfies the preset non-stationary condition, locking of the electric motor needs to be released.

For another example, in Embodiment 4, the preset stationary condition includes determining whether a difference between the desired electric motor rotated position and the measured rotated position is smaller than a preset position threshold; if this condition is used as the preset non-stationary threshold, determination of whether to satisfy the condition is continuously performed after the step 44 of locking the electric motor. If the difference between the desired electric motor rotated position and the measured rotated position is greater than the preset threshold, it is determined that the brake demand at this point satisfies the preset non-stationary condition, and locking of the electric motor needs to be released.

Such an implementation manner cannot perform different configurations based on vehicle models and actual needs; therefore, the controlling method provided in this embodiment adopts a preset non-stationary condition different from the preset stationary condition, causing the condition of exiting the steady state to be different from the condition of entering the steady state. For example, for a vehicle requiring flexibility, a preset non-stationary condition more flexible than the preset stationary condition is set, causing controlling of the brake force more flexible. Its specific implementation manner may adopt for example an RS register to set different effective conditions.

The preset stationary condition in various embodiments above are preset by the system; however, in consideration of many internal and external factors affecting the brake effect during the actual driving process of the vehicle, the preset stationary condition is not applicable in some cases; therefore, it is further needed to dynamically adjust the preset stationary condition, wherein the factors subjected to dynamic adjustment include a vehicle load, a vehicle speed, a slip ratio, a brake disc temperature, a brake disc wear, etc.

Additionally, the controlling method of the present disclosure further includes controlling the electric motor besides controlling the brake force holding device to lock the electric motor based on the brake demand. Specifically, when the actuator is a non-self-locking mechanical system shown in FIG. 1, upon releasing the electric motor shaft, the energy stored in the mechanical structure will be rapidly released to cause the electric motor to rotate reversely. To avoid damaging the transmission system and maintain the circuit steady, the electric motor is caused to output a torque in a same direction as before locking the shaft while releasing the electric motor shaft, so as to stop rapid reverse rotation of the transmission system, causing the brake release operation smoother.

It needs to be noted that the controlling methods for the actuator provided in the foregoing embodiments are all based on brake demands generated by artificial operations; however, when the brake demand is generated by a non-human operation such as an ACC (Adaptive Cruise Control), an ABS system (Anti-Lock Braking System), and an auto-pilot system, the electric motor and the brake force holding device may perform an instantaneous response based on the brake demand because it is not needed to determine the driver's intention.

Embodiment 7

Figure 6:
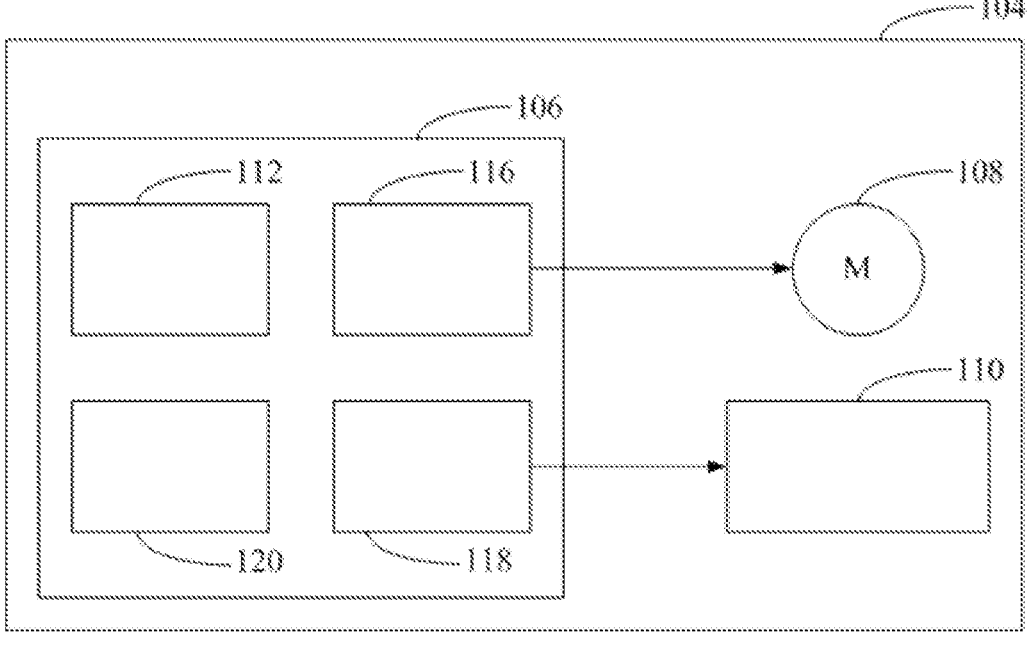
FIG. 6 is a first structural schematic diagram of an actuator provided by the present disclosure.

This embodiment provides an actuator 104, comprising an electric motor 108 with a shaft and a brake force holding device 110 (e.g., an electromagnetic brake shown in FIG. 6) capable of locking the shaft, the actuator 104 comprising:

a demand receiving module 112 configured for receiving a brake demand;

an electric motor controlling unit 116 configured for controlling the electric motor 108 based on the brake demand;

a brake force holding device controlling unit 118 configured for: if the brake demand satisfies a preset stationary condition within a preset period, controlling the brake force holding device 110 to lock the shaft of the electric motor 108.

In the actuator 104 provided in this embodiment, the controlling unit 106 may determine the brake demand received; when the brake demand satisfies the preset stationary condition within a preset period, it is determined that the current brake demand reaches the steady state and is a valid brake demand, i.e., the demand on the brake force is steady; at this point, the brake force holding device controlling unit 118 will be controlled to perform a locking operation on the shaft of the electric motor 108, thereby implementing holding of the brake force and outputting a continuous and steady brake force. Otherwise, the demand on the brake force is variable, which requires promptly adjusting the output of the brake force based on the brake demand, and not locking the electric motor, such that the shaft of the electric motor may rotate freely.

Additionally, in an electromechanical brake system, the electric motor rotated position is associated with the amount of brake force as finally outputted. Therefore, when the demand receiving module 112 receives the brake demand, the actuator controlling unit 106 may convert it to a desired electric motor rotated position, which is used as an input for determining whether to satisfy the preset stationary condition.

Determining whether to satisfy the preset stationary condition includes: with the desired electric motor rotated position $P_0$ at the start point $T_0$ of the preset period as a reference point, setting a tolerance zone based on a preset positive-negative variation amount, and determining whether the desired electric motor rotated positions $P_N$ subsequently obtained within the preset period T is located within the tolerance zone. If all of the remaining $P_N$s are located within the tolerance zone, it is believed that the variation amplitude of the brake demand is very small, nearly constant, which satisfies the preset stationary condition; then, the brake force holding device 110 is controlled to lock the shaft of the electric motor. Otherwise, if $P_N$s are located beyond the tolerance zone, it is believed that the brake demand is in change and does not satisfy the stationary condition, and then it is needed to adjust the output of brake force timely in response to the brake demand.

To further eliminate signal noises, before determining whether $P_N$s are located within the tolerance zone, the $P_N$s may be filtered in a certain manner. To this end, a data processing module 120 is provided to perform signal processing before determining whether the desired rotated position satisfies the preset stationary condition.

For example, the data processing module 120 may be a filtering module, which adopts a low-pass filter or a FIR filter to filter off apparently exceptional signal values; if the filtered desired electric motor rotated position is located within a preset tolerance zone, it is believed to satisfy the preset stationary condition.

For another example, the data processing module 120 may be a smoothing module, which is for modifying the tolerance zone after smoothing the desired electric motor rotated position.

An exemplary smoothing approach, rolling average method comprises: obtaining a mean value of all desired electric motor rotated positions, and using the obtained mean value as an input value for determining based on the preset stationary condition. For example, $$P_{smoothed} = \frac{P + P^{-1} + \ldots + P^{N-1}}{N} \qquad \text{Equation 1}$$

Equation 1 provides a smoothing approach of obtaining a mean value, wherein $P^{N-1}$ denotes a desired electric motor rotated position included in a brake demand obtained under the previous N sampling times, and $P_{smoothed}$ denotes a calculated mean value of desired electric motor rotated positions representing the previous N sampling times After obtaining $P_{smoothed}$, the tolerance zone obtained based on the preset tolerance amount $P_{offset}$ is provided below:

$$[P_{smoothed} - P_{offset}, P_{smoothed} + P_{offset}]$$

Next, with the updated preset tolerance zone as the tolerance control criterion for the desired electric motor rotated position, determining of whether to satisfy the preset stationary condition is performed.

The data processing module 120 provided in this embodiment may further have functions of a filtering module and a smoothing module, which further improves the accuracy of the controlling method.

Embodiment 8

Figure 7:
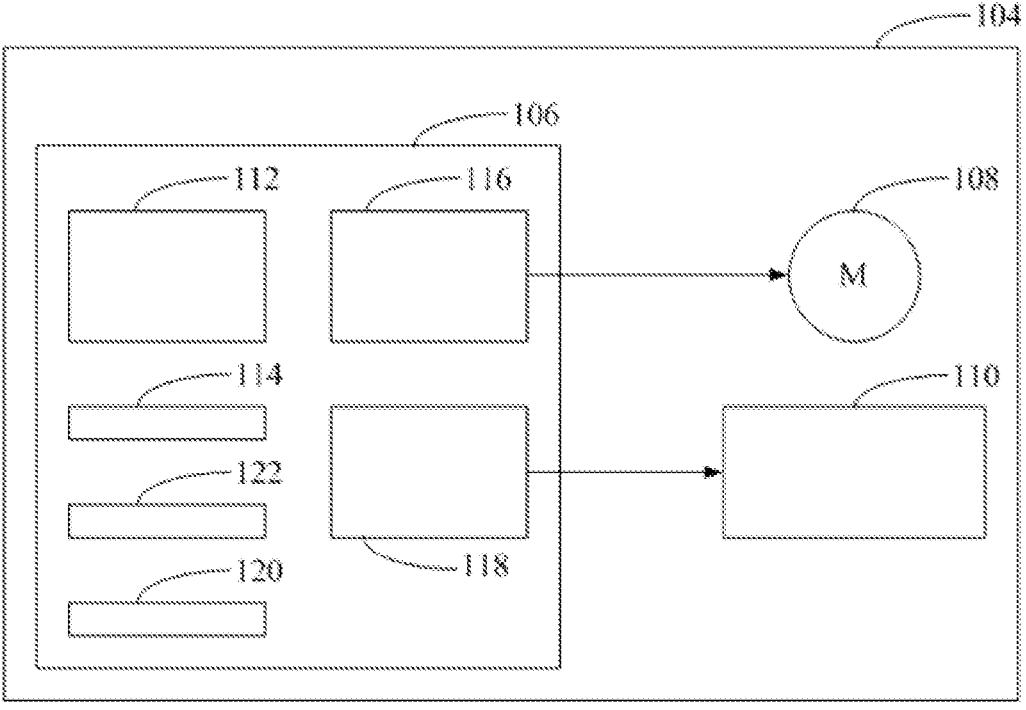
FIG. 7 is a second structural schematic diagram of an actuator provided by the present disclosure.

As shown in FIG. 7, the actuator provided by this embodiment further includes an electric motor rotated position sensor or an electric motor rotated position calculating unit 114 configured for obtaining a measured electric motor rotated position based on Embodiment 7. The electric motor rotated position sensor or electric motor rotated position calculating unit 114 here may obtain the measured electric motor rotated position by detecting a rotation angle of an electric motor rotor or a transmission mechanism or by calculation of motor current, voltage or other system internal, external relevant parameters.

After obtaining the measured electric motor rotated position $P_{measured}$, the actuator controlling unit 106 obtains a corresponding amount of brake force based on for example a real-time brake demand acquired by a brake pedal, then the amount of brake force is converted to the desired electric motor rotated position $P_{desired}$, and a difference $|P_{measured}-P_{desired}|$ therebetween is obtained. If $|P_{measured}-P_{desired}|$ is constantly smaller than the preset threshold during the entire preset period T, it may be deemed as satisfying the stationary condition. If the difference therebetween is greater than the preset threshold, it is deemed as not satisfying the stationary condition; then, the electric motor is continuously controlled based on the brake demand.

To further enhance the accuracy of determining, an electric motor rotation speed obtaining module 122 may also be provided in the actuator controlling unit 106. The electric motor rotation speed obtaining module 122 may work out the electric motor rotation speed via an electric motor rotation speed sensor or based on an electric motor operating parameter. This is because based on the operating characteristics of the electric motor, during the process of adjusting the output, the electric motor will gradually reduce the rotation speed in the course of approaching the desired rotation position so as to guarantee that it is in an extremely low rotation speed or its rotation speed is zero when reaching the desired rotated position. Therefore, a relatively low preset rotation speed threshold is set such that when the rotation speed of the electric motor is higher than the threshold, it indicates that the electric motor is still in a state of rotating towards the desired rotated position or variation of the brake force is still large, which does not satisfy the preset stationary condition. When the rotation speed of the electric motor is lower than the threshold or is zero, it is believed that the electric motor has reached or almost reached the desired rotated position and variation of the brake force is relatively small; if it is determined to further satisfy the preset stationary condition, the brake force holding device is controlled to hold the generated brake force.

Embodiment 9

Figure 8:
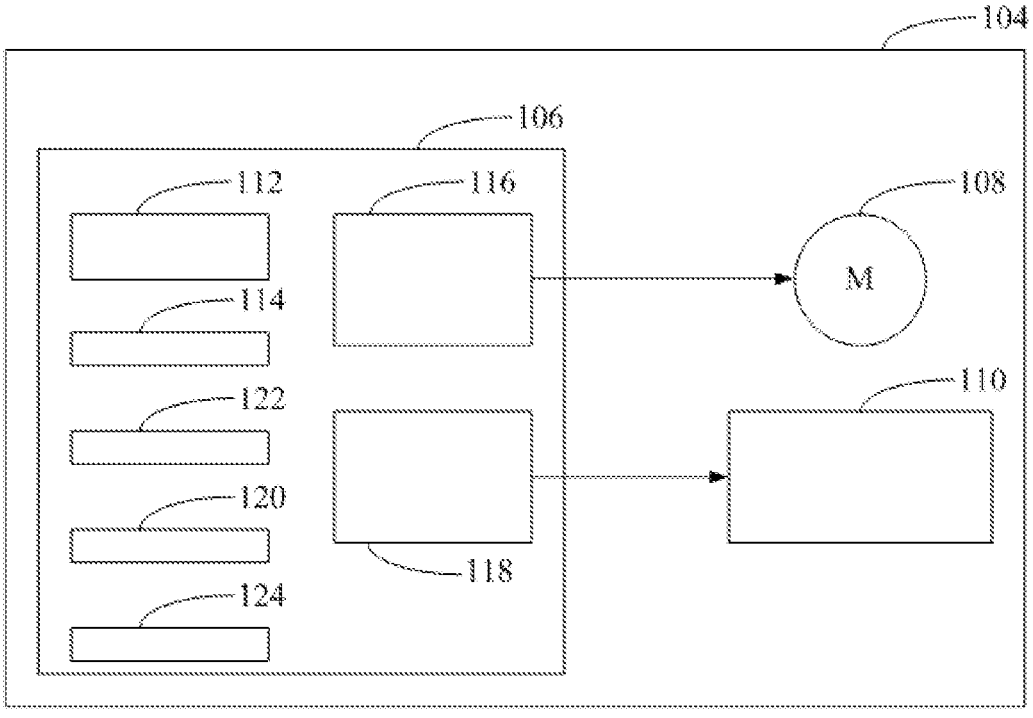
FIG. 8 is a third structural schematic diagram of an actuator provided by the present disclosure.

As shown in FIG. 8, based on the foregoing Embodiment 8, the actuator provided in this embodiment provides a counter 124 configured for counting valid brake demands.

As discussed in the foregoing embodiments, the preset period refers to a time length T of acquiring data; the counter is started at the initial point T0 of the time length; each time when a datum satisfying a preset stationary condition is acquired, the counter is incremented by 1 till aggregating to a preset threshold (i.e., when reaching a preset period); then it is determined that the brake demand within the entire period always satisfies the preset stationary condition. If data not satisfying the preset stationary condition appear before aggregating to the preset threshold, the counter is cleared.

As an exemplary embodiment, the counter always works during the entire operating time of the brake system, i.e., the counter is immediately restarted after each time of clearing. Another embodiment is to set a condition of starting the counter, e.g., the electric motor rotation speed, the brake force magnitude, etc.; the counter only starts counting when the system satisfies the start condition of the counter. As an exemplary embodiment of obtaining a brake demand, the counter has advantages such as a simple logic and a low system resource energy consumption.

In the actuator provided by the embodiments above, after locking the electric motor 108, the brake force holding device 110 is further needed to release the lock at appropriate time. Because when the driver's drive intention changes (e.g., an intention to reduce the brake force), if the brake force holding device at this time is in a locked state and the locking cannot be released untimely, the electric motor cannot rotate freely to adjust the brake force. Therefore, a preset non-stationary condition is needed to trigger releasing of the brake force holding device.

A feasible implementation manner is to further use the preset stationary condition as the preset non-stationary condition. Such an implementation manner cannot perform different configurations based on vehicle models; therefore, another manner adopts a preset non-stationary condition different from the preset stationary condition, causing the condition of exiting the steady state to be different from the condition of entering the steady state. For example, for a vehicle requiring flexibility, a preset non-stationary condition more flexible than the preset stationary condition is set, causing controlling of the brake force more flexible. Its specific implementation manner may adopt for example an RS register to set different effective conditions.

In the actuator provided by this embodiment, the actuator controlling unit performs a determination of whether to actuate the brake force holding device 110 based on the preset stationary condition; however, in consideration of many internal and external factors affecting the brake effect during the actual driving process of the vehicle, the preset stationary condition is not applicable in some cases; therefore, it is further needed to dynamically adjust the preset stationary condition, wherein factors subjected to dynamic adjustment include a vehicle load, a vehicle speed, a slip ratio, a brake disc temperature, a brake disc wear, etc.; therefore, a dynamic adjustment module may be arranged in the actuator controlling unit 106.

Additionally, when the actuator is a non-self-locking mechanical system shown in FIG. 1, upon releasing the electric motor shaft, the energy stored in the mechanical structure will be rapidly released to cause the electric motor to rotate reversely. To avoid damaging the transmission system and maintain the circuit steady, while releasing the electric motor shaft, the electric motor controlling unit 116 is used to cause electric motor to output a torque in a same direction as before locking the shaft, so as to stop rapid reverse rotation of the transmission system, causing the brake release operation smoother.

It needs to be noted that when the brake demand is not inputted by the brake pedal manipulated by the driver but is generated by a non-human operation such as an ACC (Adaptive Cruise Control), an ABS system (Anti-Lock Braking System), and an autopilot system, the actuator controlling unit 106 performs instantaneous response to the brake demand as it is unnecessary to determine the driver's intention.

Embodiment 10

Figure 9:
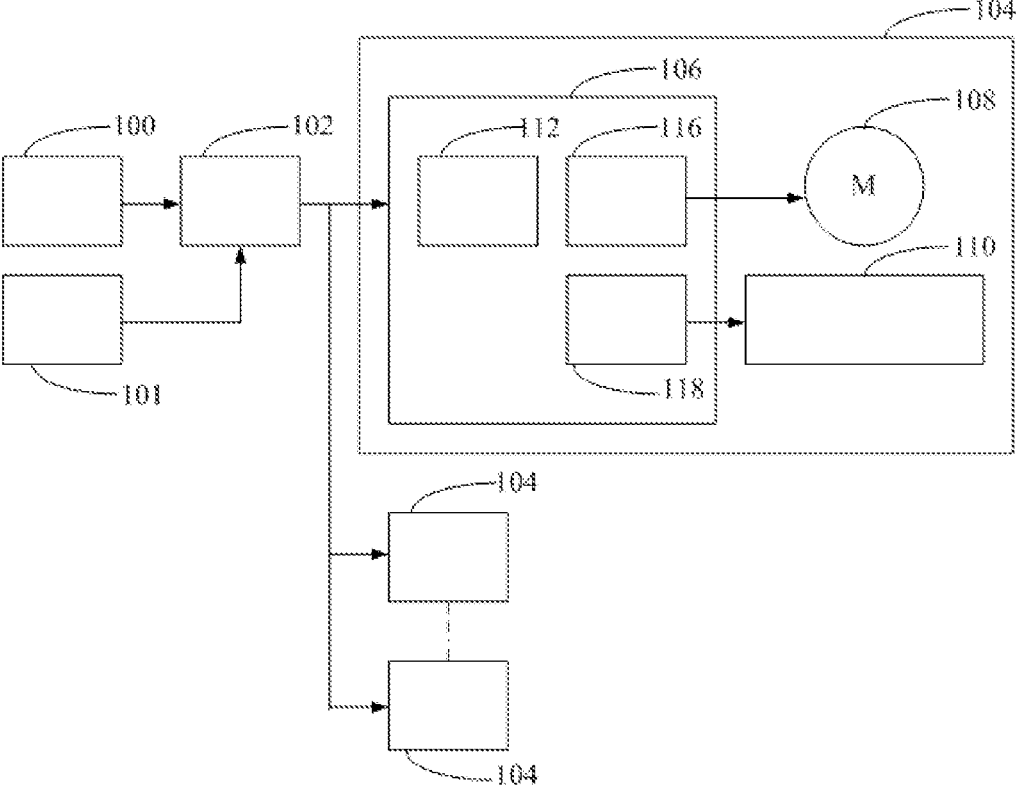
FIG. 9 is a structural schematic diagram of an electromechanical brake system provided according to an embodiment of the present disclosure.

FIG. 9 is a schematic diagram of an electromechanical brake system. The brake pedal 100 as a brake demand receiving unit is a component directly receiving the driver's input to the brake system. In the electromechanical brake system, there provides no mechanical connection and medium transmission between the brake pedal 100 and the actuator, where only a pressing-down force of the driver is converted into the electric signal of the sensor, the electric signal being transmitted to a main control unit 102. Meanwhile, a non-human operating system 101 such as an ACC (Adaptive Cruise Control), an ABS system, and an autopilot system may also emit a brake demand to the main control unit 102. One or more main control units 102 may be provided. After a brake force is assigned, the main control unit 102 transmits a corresponding brake demand to each actuator 104 at a vehicle wheel-hub, and a demand receiving module 112 of an actuator control unit 106 may thereby output a corresponding brake force to a control motor 108 after having received the brake demand. In another embodiment, the brake demand is converted to a desired electric motor rotated position, the desired electric motor rotated position being transmitted to the electric motor control unit 116 for driving the electric motor 108. A brake force holding device 110 is controlled by a brake force holding device controlling unit 118. With a power off electromagnetic brake as an example, after the brake force holding device controlling unit 118 cuts off power supply to the electromagnetic brake 110, locking of the electric motor 108 may be implemented; otherwise, the locking may be released. Besides, the brake force holding device 110 may also be a solenoid, a ratchet mechanism, etc. A plurality of sensors (e.g., an electric motor rotated position sensor) may be provided in the actuator 104, where the electric motor rotated position sensor may detect the measured electric motor rotated position by detecting the rotation angle of a rotor of the electric motor 108 or a rotation transmission mechanism in the actuator. Further, a motor current sensor, a motor voltage sensor, a brake force sensor, a wear sensor, or the like, may be provided to obtain more parameters so as to enhance the control precision.

The actuator 104 in this embodiment may be replaced by or combined with any actuator provided in the embodiments above.

The brake demand mentioned in any one of the embodiments above may be continuous or intermittent. To be specific, the brake demand may be converted into brake demand signal, and a corresponding brake demand signal (i.e., the signal value is zero) is generated even no braking force is needed, therefore the brake demand signal is continuous. If no brake demand signal is generated when there is no braking force needed, then the brake demand signal is intermittent. No matter the brake demand signal based on the brake demand is continuous or intermittent, the preset period needs to be satisfied in determining whether the stationary condition is satisfied.

What have been described above are only embodiments of the present disclosure. any modifications, equivalent substitutions, and improvements within the spirit and principle of the present disclosure should be included within the protection scope of the present disclosure.

Many variations and modifications may be made to the preferred embodiments of the invention without departing substantially from the spirit and principles of the invention. All such modifications and variations are intended to be included herein within the scope of the present invention, as defined by the following claims.

We claim:

1. A controlling method for an actuator upon braking during driving, the actuator comprising an electric motor with a shaft and a brake force holding device capable of locking the shaft, the controlling method comprising:
   receiving a brake demand;
   controlling the electric motor based on the brake demand;
   if the brake demand satisfies a preset stationary condition within a preset period, controlling the brake force holding device to lock the shaft during driving;
   wherein a desired electric motor rotated position of the electric motor is generated dependent on the brake demand;
   wherein the preset stationary condition includes that: the desired electric motor rotated position within the preset period is always located within a preset stationary zone;
   wherein driving comprises all operation states of a vehicle in which the vehicle is in motion; and
   wherein dynamic adjustment is performed to the preset stationary condition dependent on factors including a vehicle load, a vehicle speed, a slip ratio, a brake disc temperature, and a brake pad wear.

2. The controlling method for an actuator according to claim 1, wherein the controlling method further comprises:
   filtering the desired electric motor rotated position; and
   the preset stationary condition further includes that: a filtered desired electric motor rotated position is located within the preset stationary zone.

3. The controlling method for an actuator according to claim 1, wherein the controlling method further comprises:
   smoothing the desired electric motor rotated position.

4. The controlling method for an actuator according to claim 2, wherein the controlling method further comprises:
   smoothing the desired electric motor rotated position.

5. The controlling method for an actuator according to claim 1, wherein the controlling method further comprises:
   receiving or calculating a measured electric motor rotated position; and
   the preset stationary condition further includes obtaining a difference between the measured electric motor rotated position and the desired electric motor rotated position, the difference being smaller than a preset position threshold.

6. The controlling method for an actuator according to claim 1, wherein the controlling method further comprises:
   receiving a measured electric motor rotation speed; and
   the preset stationary condition further includes that the measured electric motor rotation speed is lower than a preset rotation speed threshold.

7. The controlling method for an actuator according to claim 1, wherein:
   the actuator further comprises a counter configured for recording a valid brake demand.

8. The controlling method for an actuator according to claim 7, wherein:
   the counter is caused to count brake demands which satisfy the preset stationary condition; and
   if there exists a brake demand which does not satisfy the preset stationary condition, a clearing operation on the counter is performed.

9. The controlling method for an actuator according to claim 1, wherein;

the controlling method further comprises controlling the brake force holding device to release the shaft and controlling, before the releasing, the electric motor to output a torque in a same direction as before the locking.

10. The controlling method for an actuator according to claim 1, wherein:

when the brake demand is generated by a non-human operation, the brake force holding device performs an instantaneous response to the brake demand.

11. The controlling method for an actuator according to claim 1, wherein:

the brake force holding device comprises one or more among an electromagnetic brake, a solenoid, and a ratchet mechanism.

12. The controlling method for an actuator according to claim 1, wherein:

after the brake force holding device locks the shaft, if the brake demand satisfies a preset non-stationary condition, the brake force holding device is controlled to release the shaft, wherein the preset non-stationary condition is different from the preset stationary condition.

13. An actuator comprising an electric motor with a shaft and a brake force holding device capable of locking the shaft, wherein the actuator further comprises:

a demand receiving unit configured for receiving a brake demand;

an electric motor controlling unit configured for controlling the electric motor based on the brake demand; and a brake force holding device controlling unit configured for: if the brake demand satisfies the preset stationary condition within the preset period, controlling the brake force holding device to lock the shaft wherein the brake force holding device controlling unit executes the method of claim 1; and wherein:

dynamic adjustment is performed to the preset stationary condition dependent on factors including a vehicle load, a vehicle speed, a slip ratio, a brake disc temperature, and a brake pad wear.

14. The actuator according to claim 13, wherein:

the electric motor controlling unit generates a desired electric motor rotated position dependent on the brake demand.

15. The actuator according to claim 14, wherein:

the actuator further comprises a filtering module, wherein the preset stationary condition includes that: a desired electric motor rotated position filtered by the filtering module is located within the preset stationary zone.

16. The actuator according to claim 14, wherein:

the actuator further comprises a smoothing module configured for smoothing the desired electric motor rotated position.

17. The actuator according to claim 15, wherein:

the actuator further comprises a smoothing module configured for smoothing the desired electric motor rotated position.

18. An actuator comprising an electric motor with a shaft and a brake force holding device capable of locking the shaft, wherein the actuator further comprises:

a demand receiving unit configured for receiving a brake demand;

an electric motor controlling unit configured for controlling the electric motor based on the brake demand;

a brake force holding device controlling unit configured for: if the brake demand satisfies the preset stationary condition within the preset period, controlling the brake force holding device to lock the shaft wherein the brake force holding device controlling unit executes the method of claim 1;

wherein the electric motor controlling unit generates a desired electric motor rotated position dependent on the brake demand; and wherein the preset stationary condition includes that: the desired electric motor rotated position is always located within a preset stationary zone during the preset period.

19. The actuator according to claim 14, wherein:

the actuator further comprises an electric motor rotated position sensor or an electric motor rotated position calculating unit configured for obtaining a measured electric motor rotated position; and the preset stationary condition further includes: obtaining a difference between the measured electric motor rotated position and the desired electric motor rotated position, the difference being smaller than a preset position threshold.

20. The actuator according to claim 13, wherein:

the actuator further comprises an electric motor rotation speed obtaining module configured for obtaining a measured electric motor rotation speed; and the preset stationary condition further includes that the measured electric motor rotation speed is lower than a preset rotation speed threshold.

21. The actuator according to claim 13, wherein:

the actuator further comprises a counter configured for recording a valid brake demand.

22. The actuator according to claim 21, wherein:

the counter is caused to count brake demands which satisfy the preset stationary condition; and if there exists a brake demand which does not satisfy the preset stationary condition, a clearing operation on the counter is performed.

23. The actuator according to claim 13, wherein:

the brake force holding device controlling unit is further configured for controlling the brake force holding device to release the shaft, and the electric motor controlling unit is further configured for controlling, before the releasing, the electric motor to output a torque in a same direction as before the locking.

24. The actuator according to claim 13, wherein:

the brake force holding device controlling unit is further configured for controlling, when the brake demand is generated by a non-human operation, the brake force holding device to perform an instantaneous response to the brake demand.

25. The actuator according to claim 13, wherein:

the brake force holding device comprises one or more among an electromagnetic brake, a solenoid, and a ratchet mechanism.

26. The actuator according to claim 13, wherein;

the brake force holding device controlling unit is configured for: after the brake force holding device locks the shaft, if the brake demand satisfies the preset non-stationary condition, controlling the brake force holding device to release the shaft, wherein the preset non-stationary condition is different from the preset stationary condition.

27. An electromechanical brake system, comprising the actuator according to claim 16.

28. The controlling method for an actuator according to claim 1, wherein:

the brake demand comprises a driver's brake demand that is inputted via a brake pedal.

* * * * *